(12) United States Patent
Shil

(10) Patent No.: US 11,582,083 B2
(45) Date of Patent: Feb. 14, 2023

(54) MULTI-TENANT EVENT SOURCING AND AUDIT LOGGING IN A CLOUD-BASED COMPUTING INFRASTRUCTURE

(71) Applicant: VMware, Inc., Palo Alto, CA (US)

(72) Inventor: Suman Shil, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/369,545

(22) Filed: Jul. 7, 2021

(65) Prior Publication Data

US 2021/0336838 A1    Oct. 28, 2021

Related U.S. Application Data

(63) Continuation of application No. 16/393,226, filed on Apr. 24, 2019, now Pat. No. 11,063,811.

(51) Int. Cl.
| | |
|---|---|
| *H04L 41/0233* | (2022.01) |
| *H04L 9/40* | (2022.01) |
| *H04L 41/084* | (2022.01) |
| *H04L 41/0604* | (2022.01) |
| *H04L 67/562* | (2022.01) |

(52) U.S. Cl.
CPC ...... *H04L 41/0233* (2013.01); *H04L 41/0618* (2013.01); *H04L 41/0846* (2013.01); *H04L 63/10* (2013.01); *H04L 67/562* (2022.05)

(58) Field of Classification Search
CPC ............... H04L 41/0233; H04L 67/562; H04L 41/0618; H04L 41/0846; H04L 63/10
See application file for complete search history.

(56) References Cited

U.S. PATENT DOCUMENTS

| | | | |
|---|---|---|---|
| 10,739,999 | B2 | 8/2020 | Tatsumi |
| 10,740,088 | B2 | 8/2020 | Suzuki |
| 10,749,858 | B2 | 8/2020 | Goodrum |
| 2012/0101985 | A1 | 4/2012 | Kemp |
| 2013/0031402 | A1* | 1/2013 | Dhuse ................ G06F 11/3476 |
| | | | 714/E11.03 |
| 2013/0117353 | A1 | 5/2013 | Wong |
| 2014/0012619 | A1 | 1/2014 | Natarajan |
| 2016/0373293 | A1 | 12/2016 | Kushmerick |
| 2018/0143854 | A1 | 5/2018 | Kumar |
| 2018/0144588 | A1 | 5/2018 | Movsisyan |
| 2018/0145955 | A1 | 5/2018 | Nirwal |
| 2018/0165122 | A1* | 6/2018 | Dobrev .................... G06F 8/38 |
| 2018/0295036 | A1 | 10/2018 | Krishnamurthy |

(Continued)

*Primary Examiner* — Oleg Survillo
*Assistant Examiner* — Monishwar Mohan
(74) *Attorney, Agent, or Firm* — Clayton, McKay & Bailey, PC

(57) ABSTRACT

Examples described herein include systems and methods for multi-tenant event sourcing and audit logging in a cloud-based computing infrastructure. In an example method, an event package can be received from a first microservice of an application. The event can describe any action performed within the computing infrastructure and can include various types of information. For example, it can include an event type, event ID, object type, object ID, and parent event ID. The event package can be associated with a tenant and only provided to tenant-approved recipients. The recipient can use the event package to automatically carry out steps to recreate and configure an object, or to determine the source of an event or failure within the system.

20 Claims, 5 Drawing Sheets

(56) References Cited

U.S. PATENT DOCUMENTS

| | | |
|---|---|---|
| 2018/0307522 A1 | 10/2018 | Wu |
| 2019/0026206 A1 | 1/2019 | Harutyunyan |
| 2019/0026311 A1 | 1/2019 | Ivanov |
| 2019/0109783 A1* | 4/2019 | Kommula ............... H04L 49/25 |
| 2019/0245949 A1* | 8/2019 | Wang ................. H04L 41/0895 |
| 2019/0340048 A1 | 11/2019 | Brown |
| 2019/0394204 A1* | 12/2019 | Bansal .................... G06F 21/41 |
| 2020/0007405 A1 | 1/2020 | Chitalia |
| 2020/0073584 A1* | 3/2020 | Tsuchiya ................. G06F 3/067 |
| 2020/0192654 A1 | 6/2020 | Suzuki |

* cited by examiner

MULTI-TENANT EVENT SOURCING AND AUDIT LOGGING IN A CLOUD-BASED COMPUTING INFRASTRUCTURE This application is a continuation of U.S. patent application Ser. No. 16/393,226, titled "MULTI-TENANT EVENT SOURCING AND AUDIT LOGGING IN A CLOUD-BASED COMPUTING INFRASTRUCTURE" and filed Apr. 24, 2019, which is incorporated herein in its entirety for all purposes.

BACKGROUND

Microservice architecture is a software architecture that can be used to divide large applications or services into multiple microservices. The different microservices can communicate with each other using a predetermined communication scheme, eliminating the need for one microservice to be aware of the internal workings of other microservices. Because the various microservices need not be concerned with the internal workings of other microservices, the microservice architecture allows for targeted development and updating of relevant systems without the need to update an entire application or service.

The microservice architecture also allows for increased agility when scaling a system. For example, if there is a bottleneck in one aspect of an application or service, a system administrator can scale up the relevant microservice rather than scaling up the entire application or service. This allows for more adaptable and efficient systems that reduce costs for the end customer.

The microservice architecture brings certain drawbacks, however. For example, it may be difficult to track down the source of problems that occur in a microservice, especially where the source exists in a different microservice. Without a standardized system for cataloguing events and associated identifiers, the microservices cannot communicate the information necessary to track down problems. An administrator is unable to retrieve all events for a particular object type, or retrieve all objects associated with a particular event type.

Moreover, providing an open system where all microservices can freely communicate or access a central database can cause security concerns. In the case of multi-tenant platforms, for example, multiple tenants may utilize the same software-defined data center ("SDDC"). These tenants may be competing enterprises who demand strong protections against the unwanted sharing of information. Other tenants may be different business units of the same enterprise that want unfettered access to information between each other.

As a result, a need exists for secure, multi-tenant event sourcing and audit logging in a cloud-based computing infrastructure.

SUMMARY

Examples described herein include systems and methods for multi-tenant event sourcing and audit logging in a cloud-based computing infrastructure. An example method can include receiving an event package from a first microservice of an application. In one example, a message broker can receive the event package based on an event occurring within the cloud-based computing infrastructure. The event can describe any action performed within the computing infrastructure, such as the creation of an SDDC, the instantiation of a virtual machine, or the deletion of a database, to name just a few examples.

The event package can include various types of information. For example, it can include an "event type" that describes the event, an "event ID" that identifies the event, and an "object ID" that identifies an object associated with the event. For example, the object can be impacted by the event or cause the event. In some examples, the event package can also include a "parent event ID" that identifies a parent event that caused the event at issue to occur. In some examples, the event package can also include an "object type" that identifies a general type of object associated with the event. Further, in some examples, the event package can include information relating to multiple events.

The example method can include associating the event package with a tenant. A tenant, as that term is used herein, can refer to a customer, user group, enterprise, business unit, or any other discrete group including at least one individual. In some examples, each tenant of the cloud-based computing infrastructure is a separate enterprise. These tenants can utilize overlapping physical and virtual components with the computing infrastructure. But because an enterprise's data should be kept private from another enterprise unless explicitly allowed, the management of the computing infrastructure can include measures for preventing unwanted information disclosure between tenants.

The example method can further include receiving a request for information relating to the event package from a second microservice of the application. In some examples, the request can originate from a source other than the application of the microservice, such as a microservice of a different application or from a different type of service. The request can be associated with a tenant and can request information relating to the event package. The request can be associated with a particular object ID, such as by requesting all events associated with that object ID. In some examples, the request can relate to objects associated with an object type, such as all objects having a "firewall" object type. In another example, the request can relate to all objects relating to an event ID.

The example method can include determining that the request is authorized by the tenant. The tenant can provide access controls for an event package or for event information generally. For example, a tenant can provide that event packages generated by the tenant can only be sent to users associated with the tenant. If the tenant acquires a company associated with another tenant of the computing infrastructure, the tenant can modify their access controls to provide access to event packages for users associated with the newly acquired company. The access controls can also be more granular, such that an event package generated by a particular business unit within a tenant can only be shared within that business unit or with certain other business units.

If the request for the event package is authorized by the tenant, the example method can include providing the information relating to the event package to the requesting service, such as the second microservice. In an example, the second microservice can recreate a sequence of events in the event package to perform a particular action. In examples where the requesting service requests information relating an object ID, recreating the sequence of events can be used to build the object identified by the object ID. For example, if the request relates to an object ID corresponding to the creation and configuration of an SDDC, the second service can recreate a sequence of events in the event package to create and configure a similar SDDC.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for multi-tenant event sourcing and audit logging in a cloud-based computing infrastructure. In an example method, a message broker can receive an event package from a first microservice of an application. The event can describe any action performed within the computing infrastructure. The event package can be used to track changes to objects within the computing infrastructure, including determining the source of errors or other problems. The event package can also be used by the microservice, or any other registered microservice, to recreate or duplicate objects along with all available configurations, saving time for developers and administrators.

An event package can include various types of information. For example, it can include an event type, event ID, object type, object ID, and parent event ID. The event package can be associated with a tenant and only provided to tenant-approved recipients. The recipient can use the event package to automatically carry out steps to recreate and configure an object, or to determine the source of an event or failure within the system.

Figure 1:
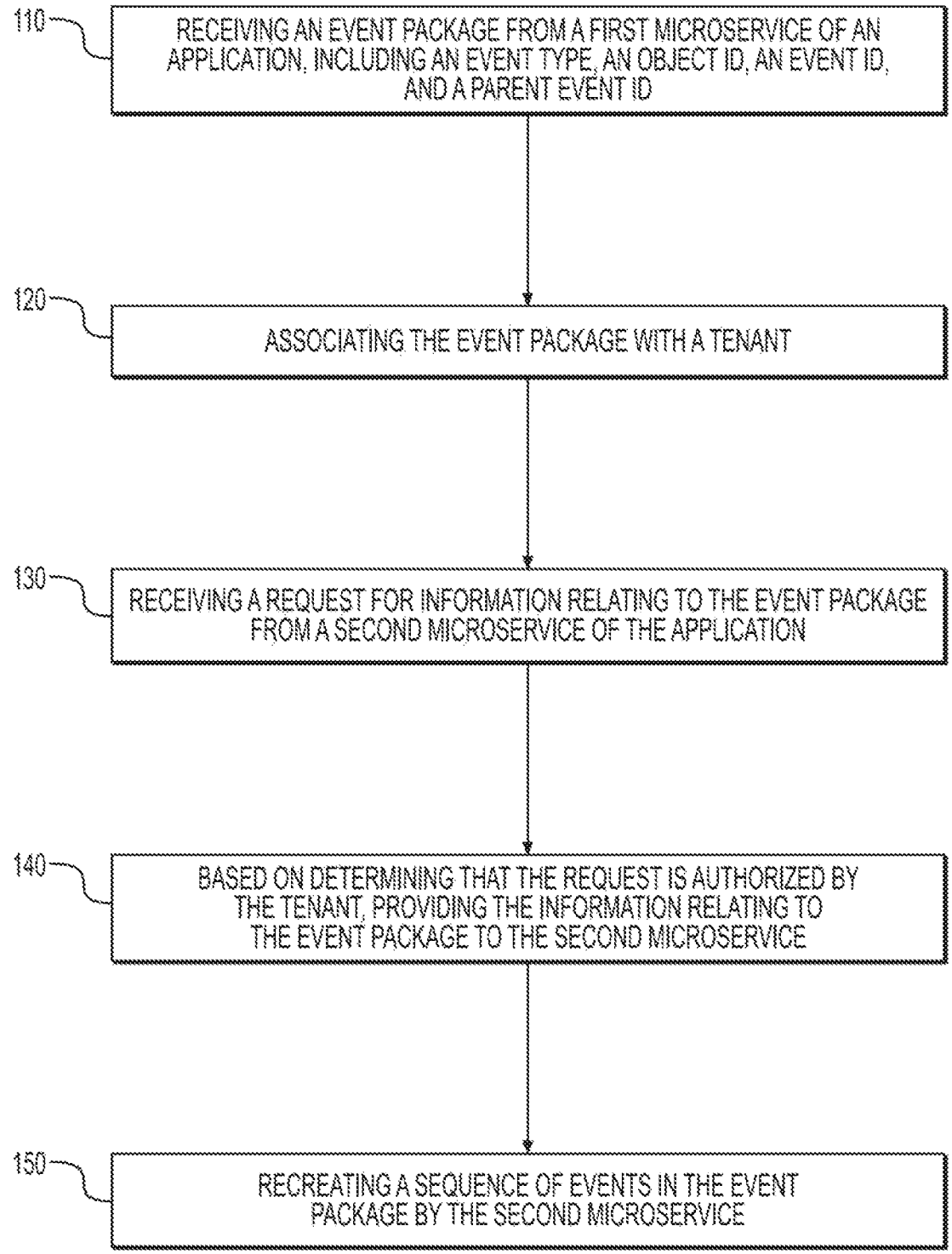
FIG. 1 is a flowchart of an example method for multi-tenant event sourcing and audit logging in a cloud-based computing infrastructure.

FIG. 1 provides a flowchart of an example method for multi-tenant event sourcing and audit logging in a cloud-based computing infrastructure. Stage 110 of the method can include receiving an event package from a first microservice of an application. The first microservice can make use of an API exposed by an event service, discussed in more detail with respect to FIG. 2. The first microservice can generate the event package based on the detection of an event, such as the creation of an SDDC or the receipt of an alarm. The first microservice can also generate the event package based on a predetermined time period elapsing or based on receiving a request to generate the event package. The event service can store the event package at a database accessible to the event service.

The event package can relate to one event or to multiple events. It can include an "event type" that describes the event, an "event ID" that identifies the specific event, and an "object ID" that identifies a specific object associated with the event. In some examples, the event package can also include a "parent event ID" that identifies a parent event that caused the event at issue to occur. In some examples, the event package can also include an "object type" that identifies a general type of object associated with the event. In examples where the event package relates to an SDDC, the event package can include an SDDC ID that identifies a specific SDDC to which the event relates.

Stage 120 can include associating the event package with a tenant. A "tenant" can be a customer, user group, enterprise, business unit, or any other discrete user group within the computing infrastructure that includes at least one individual. In some examples, each tenant of the cloud-based computing infrastructure is a separate enterprise. These tenants can utilize overlapping physical and virtual components with the computing infrastructure. But because an enterprise's data should be kept private from another enterprise unless explicitly allowed, the management of the computing infrastructure can include measures for preventing unwanted information disclosure between tenants.

In some examples, stage 120 also includes associating the event package with a sub-entity of a tenant. For example, the event package can be associated with a working group, business unit, application team, or any other sub-entity defined by the tenant. The tenant can provide rules for allowing information sharing between sub-entities of the tenant, or in some cases between the tenant and other tenants of the computing infrastructure.

Stage 130 can include receiving a request for information relating to the event package. In some examples, the request for information originates from a second microservice of the application. As explained in the introduction, some microservices do not have free communication with other microservices, so this method can provide a mechanism for microservices to share event information with each other. In some examples, the request for information can originate from a source other than the application of the microservice, such a microservice of a different application or from a different type of service. The request can be associated with a tenant and can request information relating to the event package. The request can be associated with a particular object ID. For example, the request can indicate an object ID as part of requesting all events associated with that object ID. In some examples, the request can relate to objects associated with an object type, such as all objects having a "firewall" object type. In another example, the request can relate to all objects relating to an event ID.

At stage 140, a determination can be made regarding whether the request is authorized by the tenant. The event service can access the event package to determine the identity of the tenant associated with that event package. It can use the tenant information to access stored information regarding which entities, if any, the tenant allows access to event packages. Assuming the requesting entity is approved to view this tenant's event packages, the event service can provide the information relating to the event package to the second microservice. The information relating to the event package can be the event package itself or other groupings of information, as discussed in more detail later.

At stage 150, the requesting entity, such as the second microservice of the application, can recreate a sequence of events in the event package. For example, the event package can include a list of events used to generate and configure a new SDDC according to certain standards. The second microservice may need to generate an identical SDDC. In that example, rather than manually taking steps to create and configure a new SDDC to match the old one, a user can simply request the sequence of events in an event package for creating and configuring the old SDDC. This sequence of events can be carried out again to automatically recreate the SDDC as a new entity.

The requesting entity can use an event package for reasons other than recreating an object, however. For example, the requesting entity can use an event package to track the source of a problem within a system. If the requesting entity notices an error without an obvious source, for example, it can request a history of events relating to relevant objects. The history can highlight a step that had unintended consequences resulting in a system failure, such as by a component deleting a database that was thought to be unused. Because microservices do not always communicate with one another in sufficient detail, a microservice can troubleshoot problems at stage 150 by parsing historical event listings received as part of this example method.

Figure 2:
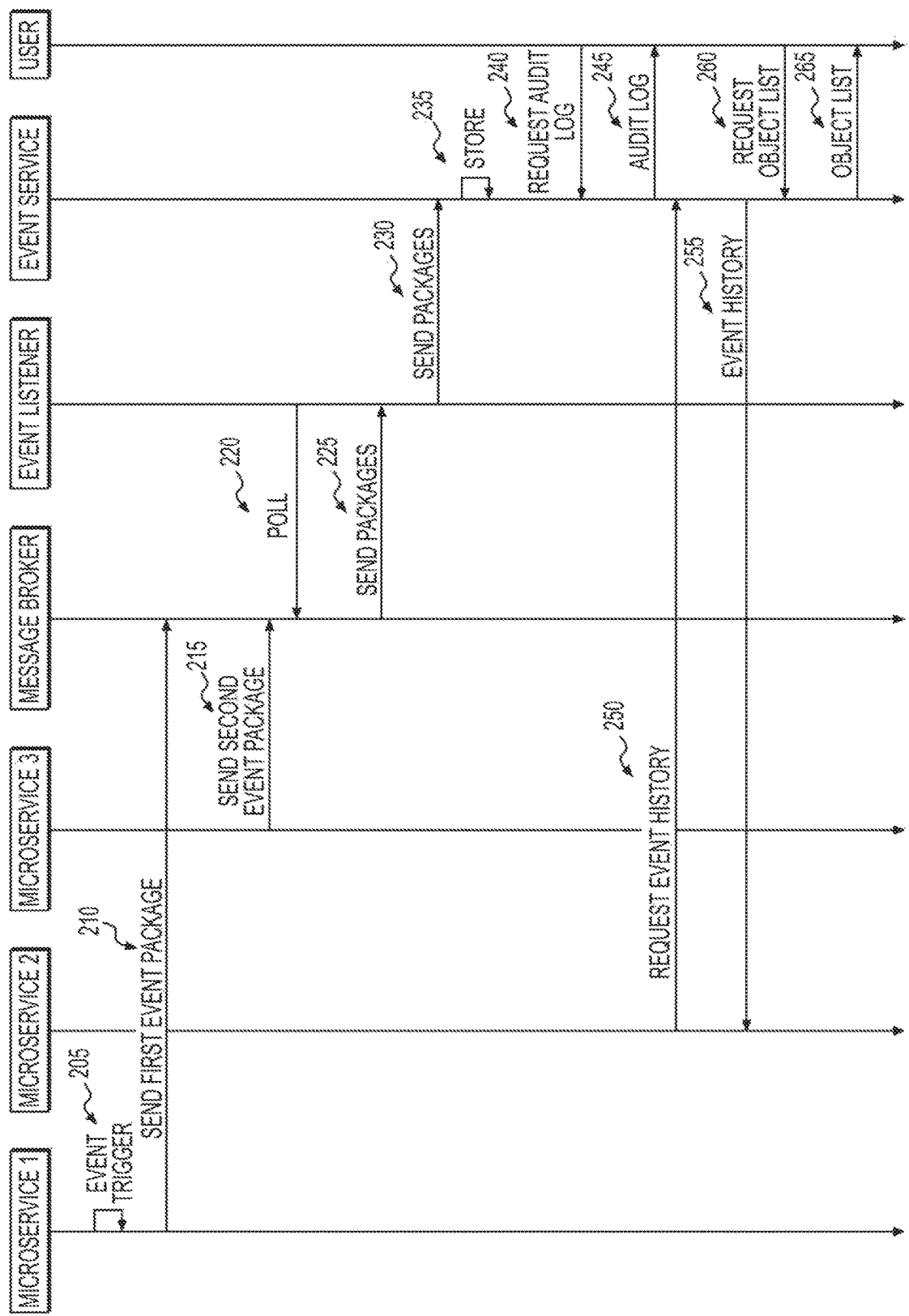
FIG. 2 is a sequence diagram of an example method for multi-tenant event sourcing and audit logging in a cloud-based computing infrastructure.

FIG. 2 provides a sequence diagram of an example method for multi-tenant event sourcing and audit logging in a cloud-based computing infrastructure. This example includes three separate microservices, which can be different microservices of a single application in one example. In other examples, one or more of the microservices can correspond to different applications or services, relative to one another. Furthermore, the various microservices can be separate services that are not necessarily "microservices"; the term microservice is used to provide context to the discussion without limiting the disclosure in any way.

At stage 205, the first microservice can detect a triggering event. The triggering event can be any type of event, alarm, or alert relevant to a cloud-based computing infrastructure. Examples of triggering events include creating, modifying, or deleting an SDDC, firewall, firewall rule, ESX host, virtual machine, or database. These examples are not intended to be limiting in any way. Any actions taken in the computing infrastructure can be considered a triggering event.

A microservice can detect a triggering event based on programming within the microservice. For example, a software developer can use a Software Development Kit ("SDK") to insert functionality into the microservice that monitors for events. In some examples, the microservice tracks each action that is performed at the microservice. The microservice can then compare each tracked action with a table of actions that need to be reported in an event package. For example, when the microservice modifies a firewall rule, performing that modification action can be an event trigger that requires an event package to be generated.

At stage 210, the first microservice can generate and send a first event package to a message broker. The first event package can relate to one or more actions performed at the first microservice, as discussed. The contents of the event package are described in more detail with respect to FIG. 3. The event package can be received by a message broker, which can be a service, such a software module, running within the cloud-based computing infrastructure. In some examples, the message broker can run on a server remote from the computing infrastructure. The message broker can be operated by the manager of the computing infrastructure. It can be accessible to the infrastructure manager but not to individual tenants of the infrastructure. The message broker can receive the first event package using relevant API calls that are programmed into the message broker and microservices.

At stage 215, a third microservice can send a second event package. The second event package can be sent based on an event trigger, similar to the first event package. It can include similar details and can be provided to the message broker using similar API commands. In this example, the first and third microservices do not communicate with one another sufficiently to exchange information regarding these event packages. Each of the first and third microservices are therefore unaware, at this stage, of the event packages generated by the other microservice.

At stage 220, an event listener can poll the message broker. The event listener can be a service, such as a software module, running within the cloud-based computing infrastructure. In some examples, the event listener can run on a server remote from the computing infrastructure. The event listener can be a script that retrieves event packages and provides them to an event service. The event listener can poll the message broker periodically, based on a predetermined time period for example. In some examples, the event listener can receive a notification that an event package has been delivered to the message broker and poll the message broker at that time. In some examples, the event listener can receive a request to poll the message broker and then perform the polling at that time. The polling at stage 220 can be performed by accessing an exposed API hook at the message broker, for example.

At stage 225, the message broker can send all event packages that have been received at the message broker but not yet delivered to the event listener. The message broker can therefore save event packages as they come in and provide them immediately upon request by the event listener. The message broker can then delete records of the event packages after providing them to the event listener.

The event listener can forward the event packages to an event service at stage 230. The event service can operate as the "brain" of the event collection and distribution system. The event service can be a software module running within the cloud-based computing infrastructure or on a server remote from the infrastructure. The event service can have read/write access to a database. At stage 235, the event service can store the received event packages within the database. The event service can then provide relevant event information to various users, applications, microservices, or other qualified entities that request the information.

An example request for information is shown at stage 240, which includes a user requesting an audit log from the event service. An audit log can be a log of events that lead to, cause, or impact another event. For example, an audit log can be an event history for an object, as described with respect to FIG. 4. In another example, an audit log can be a timeline of events that link parent events with resulting child events. As an example, a parent event can be deleting a database. As a result of the database being deleted, a child event can include detecting an error within a microservice. A further child event can include restarting a virtual machine based on the detected error. The user can request an audit log for the event of restarting the virtual machine at stage 240. The event service can provide the audit log at stage 245, which in this example could include a timeline showing that that the virtual machine restart was caused based on a detected error, and that the detected error was caused based on a database being deleted. In this way, the user can track down the source of problems in an efficient manner.

The audit log at stage 245 can include descriptions of actions or events taking place across a range of different microservices, entities, or sub-entities within the cloud-based computing infrastructure. Using the example above, a second microservice can delete a database, which causes an error in the first microservice. This can cause the first microservice to restart a virtual machine. Traditionally, a user with access to the first microservice but not to the second microservice would not be able to track the source of the problem to the database deletion within the second microservice. However, in this example the user would gain valuable insight into the source of the problem. Before providing the audit log at stage 245, the event service can confirm that the tenant(s) of any information contained in the audit log authorize the distribution of that information to the requesting user. For example, if information originates from the first and second microservices, and the tenant of those microservices has allowed communication between those microservices and the user through the event service, then the event service can provide the audit log to the user at stage 245.

At stage 250, a second microservice of the application can request event history. The request for event history can be related to a particular object, in an example. For example, the second microservice can request event history for a specific SDDC created and configured by the first microservice. Rather than creating a new SDDC from scratch and configuring it step-by-step, a developer working on the second microservice can simply request an event history for an appropriately configured SDDC. The event service can perform an authorization check to confirm that the second microservice is allowed to receive the requested information, and if so, the event service can provide the event history at stage 255.

In some examples, the second microservice can use the event history to implement one or more objects described by the event history. For example, the event history can describe a first event of creating an SDDC, a second event of creating a firewall rule, a third event of creating an ESX host, and a fourth event of configuring the firewall rule. The second microservice can perform these events in the identified order, thereby creating and configuring a new SDDC that is identical to the old SDDC. This process can be automated, such that the second microservice requests the event history at stage 250 and automatically builds the new SDDC using the information received at stage 255.

At stage 260, the user can request an object list for an identified event. The object list can include a list of objects affected by, or relevant to, a particular event. In one example, the request identifies an event such as the restart of a virtual machine. The object list for the restart event can include an identification of objects corresponding to the virtual machine, a database related to the virtual machine, and a vCPU used by the virtual machine. This list can be provided to the user at stage 265, based on the event service determining that the requestor is authorized by the tenant to receive the information in the object list.

The information provided by the event service at stages 245, 255, and 265 can be requested in the form of an ongoing stream in some examples. With respect to the audit log, for example, the user can request an ongoing stream of events pertaining to an object. The audit log provided at stage 245 can include all events relevant to that object at the time, but additional events relevant to that object could occur in the future. If the user requests an ongoing stream, the event service can update the audit log when new events are received that relate to the identified object. Similar ongoing updates can be provided for the event history originally provided at stage 255 and the object list originally provided at stage 265.

Figure 3:
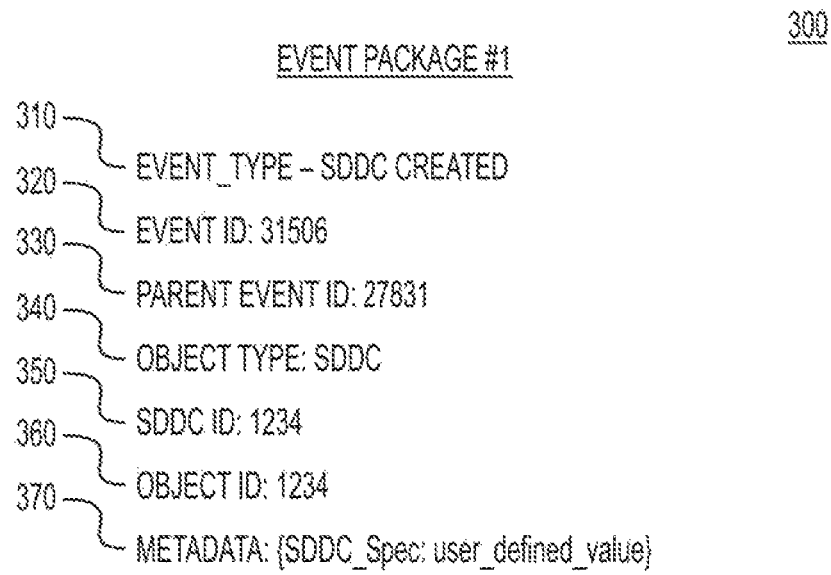
FIG. 3 is an illustration of an example event package provided as part of a method for multi-tenant event sourcing and audit logging in a cloud-based computing infrastructure.

FIG. 3 provides an illustration of an example event package provided as part of a method for multi-tenant event sourcing and audit logging in a cloud-based computing infrastructure. The event package 300 of FIG. 3 is representative of the event packages described at stages 205 and 215 of FIG. 2. The event package 300 can be a file, such as an XML file, that can be stored in a database and parsed by the event service as needed.

The event package 300 can include various fields that contain information about the event. A microservice can be configured to create the event package 300 and include specific fields within the event package 300. In this example, the event package 300 includes seven fields 310-370.

Field 310 can be an Event Type field that provides a general description of the event. In this example, the event type is "SDDC CREATED." The event types can be defined by an administrator or developer for the microservice. Example event types include SDDC CREATED, SDDC DELETED, SDDC MODIFIED, VM CREATED, VM DELETED, VM MODIFIED, FIREWALL RULE CREATED, FIREWALL RULE DELETED, FIREWALL RULE MODIFIED, ESX HOST CREATED, ESX HOST DELETED, ESX HOST MODIFIED, DATABASE CREATED, DATABASE DELETED, DATABASE MODIFIED, and so on.

Field 320 can include an Event ID for the event type. In this example, the Event ID field 320 includes the number 31506. This number can identify the event, rather than the object to which the event is relevant. In other words, the Event ID in this example describes the event of a particular SDDC being created.

Field 330 can include a Parent Event ID. The Parent Event ID can be an identification of an event having some causal relationship with the event identified in the event package 300. For example, a parent event can be the occurrence of a fatal error within an SDDC. The parent event can cause other events to take place, such as a new SDDC to be created, configured to match the old SDDC, and migrated to take over the duties of the old SDDC. In that example, the Parent Event ID field 330 could include an identification of the error event recorded in the computing infrastructure. In some examples, the parent event can occur in a different microservice or different application relative to the event described by the event ID. The parent event can be used to trace problems to their source, even across different microservices or other systems.

Field 340 can include an Object Type that identifies the type of object to which the event applies. In the example of FIG. 3, the object type is "SDDC." Other example object types include, "Firewall Rule," "ESX Host," and "Database." These fields can be useful when a user wants to obtain wide-ranging event information relevant to a general type of object, such as for comparison purposes.

Field 350 can include an SDDC ID that identifies a particular SDDC to which the event applies. For example, in the case of a Firewall Rule object type, the SDDC ID could identify the SDDC to which the Firewall Rule applies. In the example of FIG. 3, the object type is an SDDC, so the SDDC ID is simply the ID of that SDDC.

Field 360 can include an Object ID that identifies a particular object to which the event applies. For example, in the case of a Firewall Rule object type, the Object ID could identify the object to which the Firewall Rule applies. In the example of FIG. 3, the object type is an SDDC, so the object ID is simply the ID of the SDDC (which is the same number as shown by the SDDC ID field 350 for this example).

Field 370 can include metadata regarding the event. The metadata field 370 can include any information programmed to be included by an administrator or developer. In the example of FIG. 3, the metadata field 370 includes SDDC specification information, and can include a user-defined value in the field. The metadata field 370 can also include information such as the time of the event, user instructions regarding the event, settings for the SDDC or other relevant object type, and any other relevant information.

Figure 4:
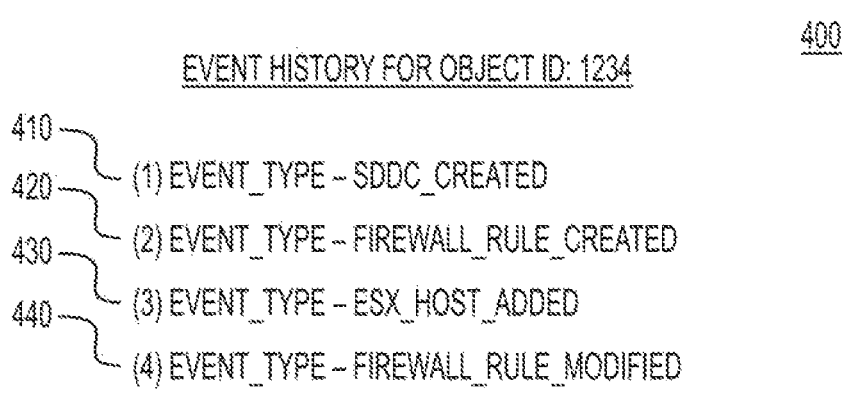
FIG. 4 is an illustration of an event history log provided as part of a method for multi-tenant event sourcing and audit logging in a cloud-based computing infrastructure.

FIG. 4 provides an illustration of an event history log provided as part of a method for multi-tenant event sourcing and audit logging in a cloud-based computing infrastructure. In this example, the event history 400 relates to Object Id 1234, which is the SDDC identified in the event package 300 of FIG. 3. The event history 400 can be a file, such as an XML file, that can be stored in a database and transmitted from the event service to a requesting entity.

The event history 400 can include a listing of events relating to an object. In the example of FIG. 4, the listing of events includes a listing of event types. For example, field 410 includes an identification of an "SDDC_CREATED" event type. Field 420 includes an identification of a "FIREWALL_RULE_CREATED" event type. Field 430 includes an identification of an "ESX_HOST_ADDED" event type. And field 440 includes an identification of a "FIREWALL_RULE_MODIFIED." The fields can be listed in chronological order to provide further historical information. In some examples, the fields also include Event IDs for each listing so a user can track down particular events. The event history 400 can therefore be used by an administrator to identify the steps taken or performed with respect to any relevant object.

Figure 5:
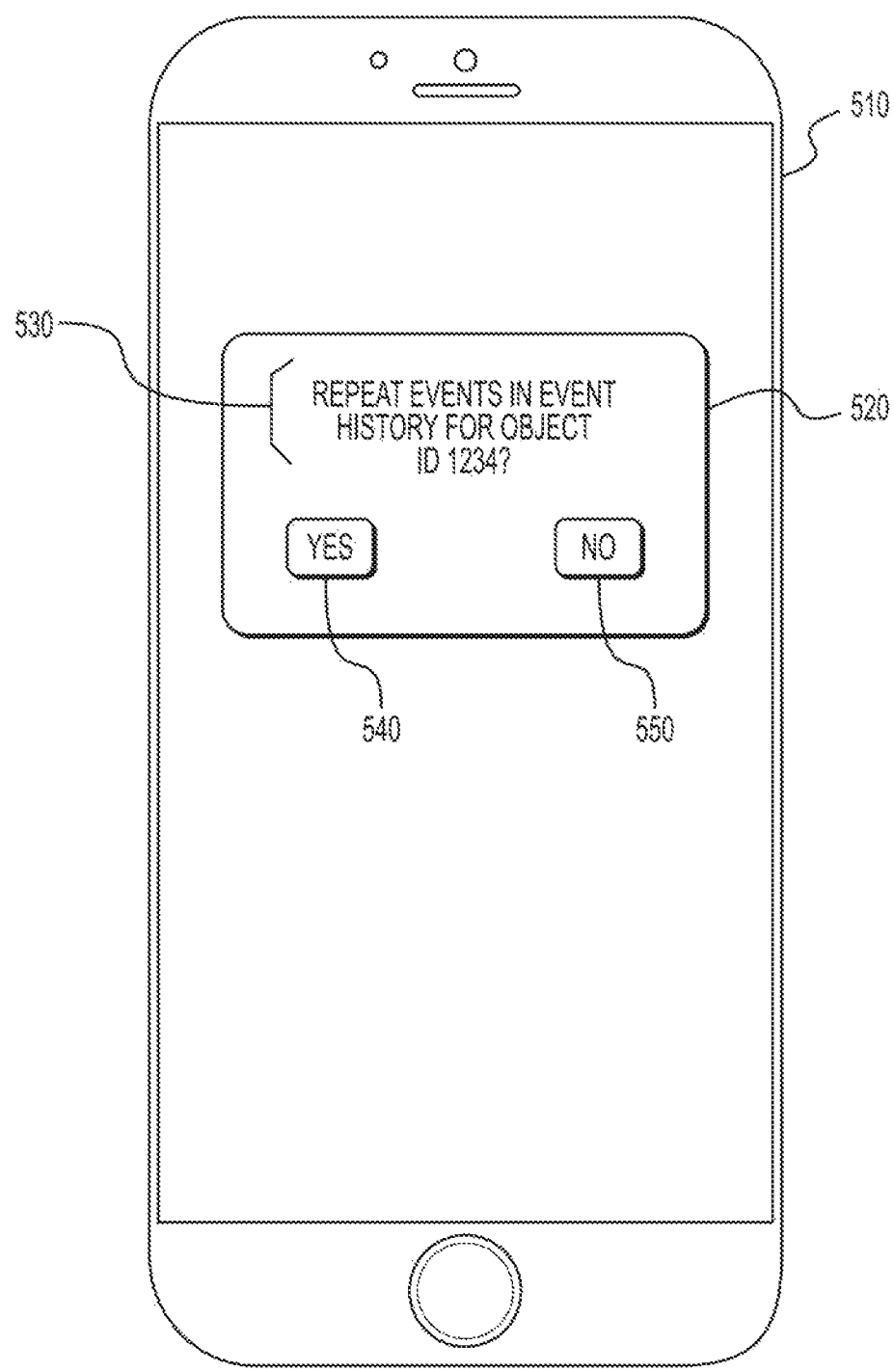
FIG. 5 is an illustration of a graphical user interface ("GUI") for repeating events in an event history for an object.

FIG. 5 provides a GUI for repeating events in an event history for an object. The GUI can be displayed on a user device 510, such a phone, tablet, laptop, or any other type of computing device having a display and a processor. The GUI of FIG. 5 can be displayed in conjunction with the event history 400 of FIG. 4.

For example, a user device 510 can receive event history based on the user requesting the event history for a particular object ID. The user device 510 can then display the prompt 520 shown in FIG. 5, which relates to the event history received at the user device 510. In this example, the prompt includes a question 530 that asks if the user wants to "Repeat events in event history for Object ID 1234?" The user can then select graphical elements 540, 550 corresponding to a "yes" or "no" answer to that question, respectively. If the user selects yes 540, the user device 510 can send a request to execute the events in the event history 400 in order to create a new object that is similar or identical to the object described by the event history 400. For example, a developer can select this option to create a new SDDC that is configured the same way as a previous SDDC, avoiding the time that would otherwise be required to manually create and configure a new SDDC.

In another example, a requesting microservice can receive the event history and recreate events relative to an object without prompting a user through a GUI. Instead, the process can be automated for a microservice that is authorized to access the event history relative to the object (e.g., an SDDC).

Figure 6:
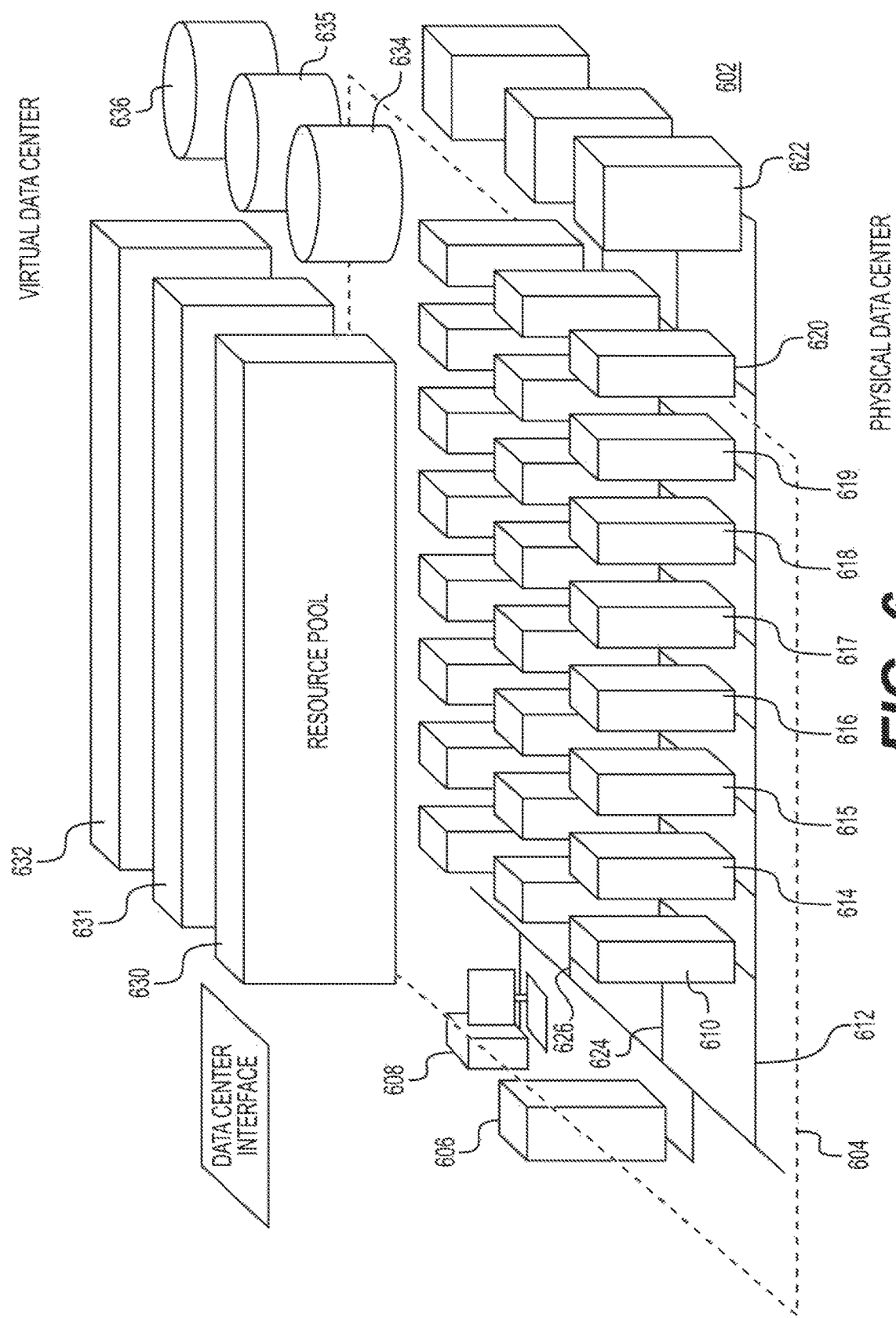
FIG. 6 is an illustration of a system for performing multi-tenant event sourcing and audit logging in a cloud-based computing infrastructure.

FIG. 6 provides an illustration of a system for performing multi-tenant event sourcing and audit logging in a cloud-based computing infrastructure. The various constructs for multi-tenant event sourcing and audit logging can be applied to a data center having both physical and virtual computing infrastructure. An example of such infrastructure is provided in FIG. 6. Specifically, FIG. 6 illustrates virtual data centers provided as an abstraction of underlying physical-data-center hardware components. A physical data center 602 is shown below a virtual-interface plane 604. The physical data center consists of a virtual-infrastructure management server ("VI-management-server") 606 and any of various different computers, such as PCs 608, on which a virtual-data-center management interface may be displayed to system administrators and other users. The interface can be a software-based control system, such as VMWARE VCLOUD DIRECTOR.

The physical data center additionally includes a number of server computers, such as server computer 610, that are coupled together by local area networks, such as local area network 612 that directly interconnects server computer 610 and 614-620 and a mass-storage array 622. The physical data center shown in FIG. 6 includes three local area networks 612, 624, and 626 that each directly interconnects a bank of eight servers and a mass-storage array. The individual server computers, such as server computer 610, each includes a virtualization layer and runs multiple virtual machines. Different physical data centers may include many different types of computers, networks, data-storage systems and devices connected according to many different types of connection topologies. The virtual-data-center abstraction layer 604, a logical abstraction layer shown by a plane in FIG. 6, abstracts the physical data center to a virtual data center comprising one or more resource pools, such as resource pools 630-632, one or more virtual data stores, such as virtual data stores 634-636, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability. It can migrate virtual machines to most effectively utilize underlying physical hardware resources, to replace virtual machines disabled by physical hardware problems and failures, and to ensure that multiple virtual machines supporting a high-availability virtual appliance are executing on multiple physical computer systems. This ensures the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

The virtual data center provided by a service provider can be configured through a control system interface displayed on a user device, such as a computer or smartphone. In some examples, both the service provider and the tenants of that service provider can access certain configuration information through a GUI associated with the control system.

The events described in previous examples can be events involving any of the components shown in FIG. 6. Furthermore, the components of FIG. 2, such as the microservices, message broker, event listener, and event service can execute on one or more components of the virtual data center shown in FIG. 6.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for event sourcing and audit logging in a cloud-based computing infrastructure, comprising:
    receiving an event package from a first instance of an application, wherein the event package comprises: information relating to an event occurring in the cloud-based computing infrastructure, an object ID identifying a first software-defined data center (SDDC), and a sequence of events for creating a new SDDC with the same settings as the first SDDC;
    receiving a request for the information relating to the event package from a second instance of the application; and
    based on determining that the request is authorized, providing the information relating to the event package to the second instance,
    wherein the second instance performs the sequence of events in the event package to create the new SDDC with the same settings as the first SDDC.

2. The method of claim 1, wherein the request for the information relates to the object ID.

3. The method of claim 1, wherein the information in the event package is related to multiple events.

4. The method of claim 1, wherein the request for the information requests all objects relating to an event ID in the event package.

5. The method of claim 1, wherein the event package further comprises an object type, and wherein the request for the information requests all events relating to the object type.

6. The method of claim 1, wherein the event package further comprises a parent event ID that identifies a parent event that caused the event at issue to occur.

7. The method of claim 1, wherein the event package is associated with a particular tenant of the cloud-based computing infrastructure.

8. A non-transitory, computer-readable medium containing instructions that, when executed by a hardware-based processor, performs stages for event sourcing and audit logging in a cloud-based computing infrastructure, the stages comprising:
    receiving an event package from a first instance of an application, wherein the event package comprises: information relating to an event occurring in the cloud-based computing infrastructure, an object ID identifying a first software-defined data center (SDDC), and a sequence of events for creating a new SDDC with the same settings as the first SDDC;
    receiving a request for the information relating to the event package from a second instance of the application; and
    based on determining that the request is authorized, providing the information relating to the event package to the second instance,
    wherein the second instance performs the sequence of events in the event package to create the new SDDC with the same settings as the first SDDC.

9. The non-transitory, computer-readable medium of claim 8, wherein the request for the information relates to the object ID.

10. The non-transitory, computer-readable medium of claim 8, wherein the information in the event package is related to multiple events.

11. The non-transitory, computer-readable medium of claim 8, wherein the request for the information requests all objects relating to an event ID in the event package.

12. The non-transitory, computer-readable medium of claim 8, wherein the event package further comprises an object type, and wherein the request for the information requests all events relating to the object type.

13. The non-transitory, computer-readable medium of claim 8, wherein the event package further comprises a parent event ID that identifies a parent event that caused the event at issue to occur.

14. The non-transitory, computer-readable medium of claim 8, wherein the event package is associated with a particular tenant of the cloud-based computing infrastructure.

15. A system for event sourcing and audit logging in a cloud-based computing infrastructure, comprising:
    a memory storage including a non-transitory, computer-readable medium comprising instructions; and
    a computing device including a hardware-based processor that executes the instructions to carry out stages comprising:
        receiving an event package from a first instance of an application, wherein the event package comprises: information relating to an event occurring in the cloud-based computing infrastructure, an object ID identifying a first software-defined data center (SDDC), and a sequence of events for creating a new SDDC with the same settings as the first SDDC;
        receiving a request for the information relating to the event package from a second instance of the application; and
        based on determining that the request is authorized, providing the information relating to the event package to the second instance,
        wherein the second instance performs the sequence of events in the event package to create the new SDDC with the same settings as the first SDDC.

16. The system of claim 15, wherein the request for the information relates to the object ID.

17. The system of claim 15, wherein the information in the event package is related to multiple events.

18. The system of claim 15, wherein the request for the information requests all objects relating to an event ID in the event package.

19. The system of claim 15, wherein the event package further comprises an object type, and wherein the request for the information requests all events relating to the object type.

20. The system of claim 15, wherein the event package further comprises a parent event ID that identifies a parent event that caused the event at issue to occur.

\* \* \* \* \*